United States Patent Office 2,870,101
Patented Jan. 20, 1959

2,870,101
POLYALKYLENE OXIDE RESINS

David Gordon Stewart, Epsom, England, assignor to Shell Development Company, New York, N. Y., a corporation of Delaware No Drawing. Application October 5, 1956
Serial No. 614,084

Claims priority, application Great Britain October 10, 1955

16 Claims. (Cl. 260—2)

This invention relates to polymers of alkylene oxide and processes for preparing the same. More particularly, it relates to the preparation of polymers of alkylene oxides by the utilization of certain polymerization catalysts.

It has long been known that alkylene oxides may be polymerized by a variety of techniques to produce polymers which have a large variety of practical applications in the chemical arts. However, present methods for producing polymers of alkylene oxides do not yield polymers of very high molecular weight, i. e., in the order of 20,000 or higher. By this invention, it has now been found that a simple process is available for producing polymers of alkylene oxides having high molecular weights by the utilization of certain polymerization catalysts which are more fully described hereinafter.

It is an object of this invention to provide novel processes for the polymerization of alkylene oxides. It is a further object of this invention to provide processes for the polymerization of alkylene oxides by the use of certain organo-metallic catalysts. It is still another object of this invention to provide high molecular weight polymers of alkylene oxides which are prepared by the utilization of certain organo-metallic complexes as polymerization catalysts. Other objects will become apparent as the description proceeds.

These and other objects are accomplished by conducting the polymerization of an alkylene oxide at elevated temperatures in the presence of a catalyst complex of the formula $[M_1(R_1)(R_2)_a(R_3)_b(R_4)_c(R_5)_d](M_2)_y$ wherein $M_1$ and $M_2$ are different metals which $M_1$ is a metal selected from groups II and III of the periodic table, $M_2$ is a metal selected from groups I, II and III of the periodic table, $R_1$ is selected from alkyl or alkoxy, $R_2$ is alkyl, $R_3$ is alkoxy, $R_4$ is halogen, $R_5$ is hydrogen, and $a$, $b$, $c$, and $d$ are integers selected so that their sums equal 2, 3, or 4, and $y$ is a variable number which will satisfy the valency requirements of the complex.

The catalysts described above also may be described as alkoxo salts and metal-alkyl complexes. The alkoxo salts (also referred to sometimes as alkoxy salts) are derived from alcoholates which possess the property of forming complex acids with alcohols, the complex acid being the so-called "alkoxyacids." (See "Organic Chemistry," Frank C. Whitmore, D. Van Nostrand Co., 1937.) A typical alkoxyacid is prepared as follows:

$$Al(OC_4H_9)_3 + C_4H_9OH \rightarrow H^+[Al(OC_4H_9)_4]^-$$

The alkoxo salts are prepared by placing the hydrogen atom, or cation, with a metallic atom from groups I, II or III of the periodic table as, for example, magnesium. Typical alkoxo salts are represented by the following complexes:

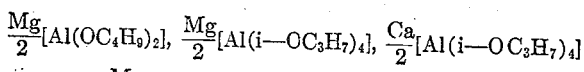

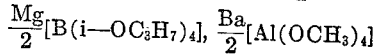

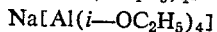

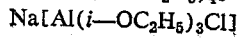

and the like. The metal-alkyl complexes, which may also be used as the catalyst, are those which are obtained from the reaction of a metal alkyl in which the metallic element is selected from the metal of groups II or II of the periodic table with a metal salt in which said metal is selected from groups I, II or III of the periodic table, both metallic elements being different. In this category, it is particularly preferred that the metal salt be selected from an alkali metal or an alkaline earth metal although not necessarily limited thereto. Typical complexes in this group include reaction products of the following: aluminum triethyl and sodium fluoride, aluminum triisobutyl and sodium chloride, boron tripropyl, and lithium hydride, aluminum trimethyl and potassium iodide, aluminum tripropyl and barium chloride, aluminum triethyl and zinc chloride, boron triethyl and cupric chloride, and the like.

Although many other complexes are within the scope of the definition of the catalysts, certain preferences are made based on present economic considerations. For example, in the most preferred embodiment, the catalyst contains alkoxides of aluminum with a metal from group I or II of the periodic table. On the other hand, complexes which are prepared from gold or silver while being highly efficient are inordinately expensive. In considering the alkoxy radicals and the alkyl radicals, it is preferred that they contain up to 6 carbon atoms.

The processes of this invention are effective for the polymerization of alkylene oxides of all types but it is most simple to polymerize alkylene oxides having from 2 to 4 carbon atoms such as ethylene oxide, 1,2-propylene oxide, isobutylene oxide, butadiene mono-oxide, and the like. Other alkylene oxides include, for example, 1,2-pentylene oxide, 2,3-hexylene oxide, 3,4-hexylene oxide, 3-ethylene-2,3-pentylene oxide, 1,2-dodecylene oxide, cyclopentene oxide, cyclohexene oxide, camphene oxide, styrene oxide, benzylethylene oxide, and the like.

The polymerization reaction may be carried out in the presence of a common hydrocarbon solvent which includes aromatics such as benzene, toluene and the like, or aliphatics such as pentane, isooctane, and the like. Chlorinated hydrocarbons such as dichloroethane may also be used. In those cases where the alkylene oxide is a liquid at normal temperatures or is in the liquid state under the conditions of the reaction, a solvent need not be used. The temperature at which the polymerization reaction is conducted ranges from about 90° C. to 160° C. but may range from about 0° C. to as high as 300° C. Ordinarily, the reaction is conducted under pressures ranging from atmospheric to about 50 atmospheres. Under the above-described conditions of temperature and pressure the reaction times will vary from a few hours to several days. By judicious selection of the conditions of reaction and the choice of the catalyst, the viscosity of the resulting polymer may be carefully controlled to obtain polymers having rather narrow ranges of molecular weights.

The quantity of the catalyst may be varied over a considerable range, the range being from about .0001 mol to more than 1 mol based on the alkylene oxide. However, since too great an excess of the catalyst may result in considerable waste, it is more preferred that the quantity of the catalyst range from about .001 mol to about .05 mol based on the quantity of the alkylene oxide. This preferred amount however applies in those instances where the alkylene oxide has from 2 to 4 carbon atoms. Where the alkylene oxide has a greater number of carbon atoms the quantity of the catalyst should be somewhat higher.

The processes of this invention provide a substantial advantage in that they lend themselves to various types of production techniques such as batch, continuous, or intermittent operations. It will be observed that for batch operation a substantial advantage accrues in that conventional reaction vessels may be used. In that case, the operation is usually conducted by bringing the alkylene oxide and the catalyst together in a closed reaction vessel wherein the polymerization is conducted with or without agitation of the reaction mixture. If the reaction is to be effected in a continuous reactor, it is convenient to use a residence reactor in which case a mixture of the alkylene oxide, catalyst and solvent, if one is used, is charged to the vessel fitted with an external pump connected to more or less opposite ends of the reaction vessel whereby agitation and circulation is provided. After the desired extent of the polymerization has occurred, fresh charge-material is fed continuously or intermittently to the vessel and substantially corresponding amounts of reaction product are withdrawn. A steady state is reached and the desired polymer is produced in continuous fashion. It will be understood that the usual types of fittings and accessories will be required, such as pressure gauges, heating and cooling equipment and the like.

At the end of the reaction, irrespective of the means employed, the unreacted alkylene oxide is recovered by any conventional means as by distillation or by distillation combined with precipitation by the use of a suitable known solvent such as paraffins, and the resulting polymer purified by washing with a liquid in which the polymer is insoluble. If desired, the polymer is dissolved in a solvent and slowly precipitated by the addition of a known solvent miscible with the solvent. In the normal operations, it will be found that concentrations of the filtrate from this latter operation usually yield low molecular weight oils, the amount of which depends on the catalyst used.

The products obtained, particularly the solid polymers, are valuable as thickening agents. The higher molecular weight polymers from polyethylene oxide are water soluble and hence find a variety of applications as containers and film-forming substances. Additionally, the polymers are useful as lubricants, molding compositions, binders and as intermediates in rubber, food, pharmaceutical and agricultural applications in addition to finding numerous other useful applications in the industrial arts. In almost all applications, it is desirable to remove the catalyst or its residue from the polymer. This may be accomplished by dissolving the polymer in water which preferably contains a small amount of ammonium hydroxide, a metal hydroxide precipitate which forms is then filtered off and the water is separated by evaporation or other suitable means. If the polymer is insoluble in water, the catalysts, or their residues, may be separated by extraction with a dilute mineral acid such as hydrochloric acid, sulfuric acid, or the like.

The following examples will illustrate the processes of this invention in greater detail:

*Example I*

Liquid ethylene oxide (88.7 parts by weight) is run into a solution of magnesium aluminum isopropoxide,

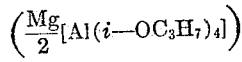

(0.8 part by weight) in benzene (17.6 parts by weight), in an autoclave which is then heated at 100° C. for 18 hours. The product is diluted with benzene (300 parts by weight) and the excess ethylene oxide recovered by distillation. The clear viscous solution obtained is added slowly to petroleum ether (300 parts by weight) with stirring. A colorless polymer (7 parts by weight) is precipitated which is filtered off and dried. The relative viscosity ($\eta_R$) of this polymer in 0.1% trichloroethylene solution is 1.174. Concentration of the filtrate gives a small quantity of oily material (2.4 parts by weight); this is an ethylene oxide polymer of lower molecular weight than the colorless polymer just mentioned. The colorless polymer (10 parts by weight) is dissolved in water (250 parts by weight) containing concentrated ammonia solution (1 part by weight) and refluxed for 2 hours. The white inorganic aluminum containing material which is precipitated is filtered off. The polymer is recovered from solution by distilling off the water, dissolving in benzene and precipitating as described above. In this way, the aluminum content of the polymer is reduced to 0.05%.

*Example II*

Propylene oxide (83 parts by weight) is run into a solution of calcium aluminum isopropoxide.

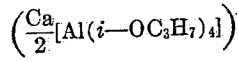

(3 parts by weight) in n-hexane (33 parts by weight), in an autoclave which is then heated at 140° C. for 17 hours. After recovering excess oxide and solvent by distillation, the water insoluble polymer is treated with hot dilute hydrochloric acid to decompose any catalyst present and remove resulting traces of metals. Thereafter, the polymer is washed with water and dried. The polymer is a colorless rubbery solid which is soluble in most organic solvents. The relative viscosity of this polymer in 0.1% trichloroethylene solution is 1.175.

*Example III*

A liquid mixture of ethylene oxide (69.6 parts by weight) and propylene oxide (17.6 parts by weight) is run into a solution of the reaction product of aluminum triethyl and sodium fluoride (1 part by weight) in ethylene dichloride (25 parts by weight) in an autoclave, which is then heated at 100° C. for 65 hours. After recovering the unchanged oxides by distillation, the polymer product is dried until free of solvent, washed with petroleum ether (100 parts by weight) and redried. The polymer is a colorless solid (yield: 73 parts by weight) the relative viscosity of which in 0.1% trichloroethylene solution is 1.037.

*Example IV*

The procedure of Example I is repeated except that the ethylene oxide is replaced with a proportional quantity of styrene oxide to produce a polymer thereof.

I claim as my invention:

1. A process for polymerizing a vic-epoxy hydrocarbon free of unsaturation other than aromatic unsaturation comprising reacting said hydrocarbons at a temperature from about 0° C. to about 300° C. in the presence of a complex polymerization catalyst of the formula $[M_1(R_1)(R_2)_a(R_3)_b(R_4)_c(R_5)_d](M_2)_y$ wherein $M_1$ and $M_2$ are different metals in which $M_1$ is a metal selected from groups II and III of the periodic table, $M_2$ is a metal selected from groups I, II and III of the periodic table, $R_1$ is selected from the group consisting of alkyl and alkoxy, $R_2$ is alkyl, $R_3$ is alkoxy, $R_4$ is a halogen, $R_5$ is hydrogen, and the sum of the integers $a+b+c+d$ is a number from 2 to 4 and $y$ is a positive whole number.

2. The process of claim 1 in which the catalyst is a complex of aluminum trialkyl and an alkali metal halide.

3. The process of claim 1 in which the catalyst is magnesium aluminum isopropoxide.

4. The process of claim 1 in which the catalyst is copper aluminum butoxide.

5. The process of claim 1 in which the catalyst is magnesium aluminum butoxide.

6. The process of claim 1 in which the catalyst is calcium aluminum isopropoxide.

7. The process of claim 1 in which the catalyst is a complex of aluminum triethyl and sodium fluoride.

8. Polymerized vic-epoxy hydrocarbon free of unsaturation other than aromatic unsaturation having a molecular weight in excess of 20,000 which are prepared by the process which comprises reacting said hydrocarbons at a temperature from about 0° C. to about 300° C. in the presence of a complex polymerization catalyst of the formula

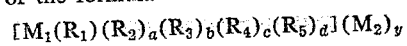

wherein $M_1$ and $M_2$ are different metals where $M_1$ is a metal selected from groups II and III of the periodic table, $M_2$ is a metal selected from groups I, II and III of the periodic table, $R_1$ is selected from the group consisting of alkyl and alkoxy, $R_2$ is alkyl, $R_3$ is alkoxy, $R_4$ is a halogen atom, and $R_5$ is a hydrogen atom, the sum of the integers $a+b+c+d$ is a number from 2 to 4, and $y$ is a positive whole number.

9. The product of claim 8 in which the catalyst is a complex of aluminum alkyl and an alkali metal halide.

10. The product of claim 8 in which the catalyst is magnesium aluminum isopropoxide.

11. The product of claim 8 in which the catalyst is copper aluminum butoxide.

12. The product of claim 8 in which the catalyst is magnesium aluminum butoxide.

13. The product of claim 8 in which the catalyst is calcium aluminum isopropoxide.

14. The product of claim 8 in which the mono-olefinically unsaturated hydrocarbon is ethylene oxide.

15. The product of claim 8 in which the mono-olefinically unsaturated hydrocarbon is propylene oxide.

16. The product of claim 8 in which the mono-olefinically unsaturated hydrocarbon is a mixture of ethylene oxide and propylene oxide.

References Cited in the file of this patent

UNITED STATES PATENTS

| | | |
|---|---|---|
| 1,976,678 | Wittmer | Oct. 9, 1934 |
| 2,706,181 | Pruitt et al. | Apr. 12, 1953 |
| 2,706,182 | Pruitt et al. | Apr. 12, 1953 |
| 2,706,189 | Pruitt et al. | Apr. 12, 1953 |
| 2,767,158 | Schlenker et al. | Oct. 16, 1956 |